United States Patent [19]

Poe

[11] Patent Number: 4,563,025
[45] Date of Patent: Jan. 7, 1986

[54] CONDUIT CONNECTOR STRUCTURE AND SEALING-RING THEREFOR

[75] Inventor: Jack L. Poe, Riverton, Utah

[73] Assignee: Rocky Mountain Nuclear Manufacturing and Engineering, Inc., West Valley City, Utah

[21] Appl. No.: 509,873

[22] Filed: Jul. 1, 1983

[51] Int. Cl.$^4$ ............................................. F16L 25/00
[52] U.S. Cl. ................... 285/334.2; 285/336; 285/367; 285/DIG. 18; 277/236
[58] Field of Search ...................... 285/334.2, 336, 367, 285/DIG. 18; 277/236 X, 167.5, 226

[56] References Cited

U.S. PATENT DOCUMENTS

| 969,423 | 9/1910 | Tanner et al. | 285/334.2 |
| 2,766,999 | 10/1956 | Watts et al. | 285/334.2 |
| 3,104,121 | 9/1963 | Nordin et al. | 277/236 |
| 3,210,098 | 10/1965 | Watts | 285/334.2 |
| 3,325,176 | 6/1967 | Latham et al. | 285/110 |
| 3,507,506 | 4/1970 | Tillman, III | 285/334.2 |
| 3,749,426 | 7/1973 | Tillman, III | 285/334.2 |
| 4,214,763 | 7/1980 | Latham | 285/336 |
| 4,390,186 | 6/1983 | McGee et al. | 277/236 |
| 4,470,609 | 9/1984 | Poe | 285/336 |

FOREIGN PATENT DOCUMENTS 2025555 1/1980 United Kingdom ............. 285/334.2

OTHER PUBLICATIONS

Engineering Materials and Design, vol. 21, No. 7, Jul. 1977, p. 16.

Primary Examiner—Cornelius J. Husar
Assistant Examiner—Eric K. Nicholson
Attorney, Agent, or Firm—M. Ralph Shaffer

[57] ABSTRACT

A conduit-connector coupling structure, otherwise sometimes known as a clamp-type connector, incorporates plural clamp segments operating to cam together flange members producing the coupling. Clamp segments are employed with connecting attachment means so as to draw together the flange members employed upon the tightening down of the clamp segments relative to each other. The forward flange portions of each of the flange members are provided with recesses mutually accommodating the insertion of a metallic sealing ring. When the flange members are drawn together the sealing ring is held in radial compression. The ring itself is provided with mutually spaced peripheral sealing lands on respective ones of its oppositely tapered sides. The ring is designed so that the recesses separating the lands will essentially maintain their integrity for all radial compressions to the ring which is intended for use solely within the elastic limit and below the yield point of the material of such ring. Thus, should a portion of the seat structure of the flange members become scored or damaged so as to prevent a complete sealing action to take effect as between such flange member and one of the sealing lands of the ring, the remaining lands will still be present to effect the sealing function. An equivalent advantage obtains where it is one of the lands that might have a marred surface; the remaining lands will effect the seal. The recesses between the sealing lands of the sealing ring are provided, additionally, in such sealing ring to distribute the stress pattern and also to enable the ring to remain within the elastic limit of the seal ring material.

12 Claims, 7 Drawing Figures

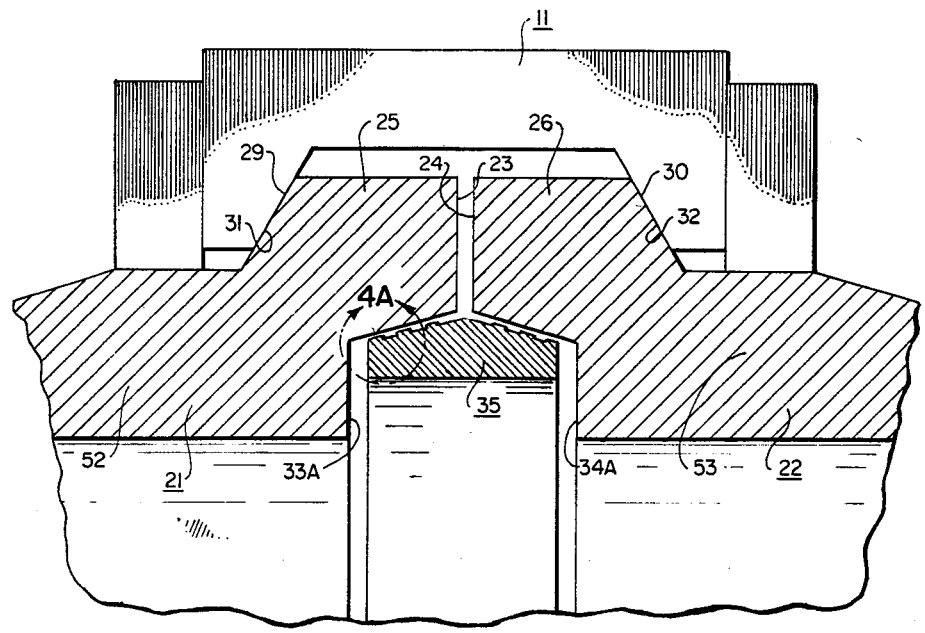
Fig. 4
Fig. 4A
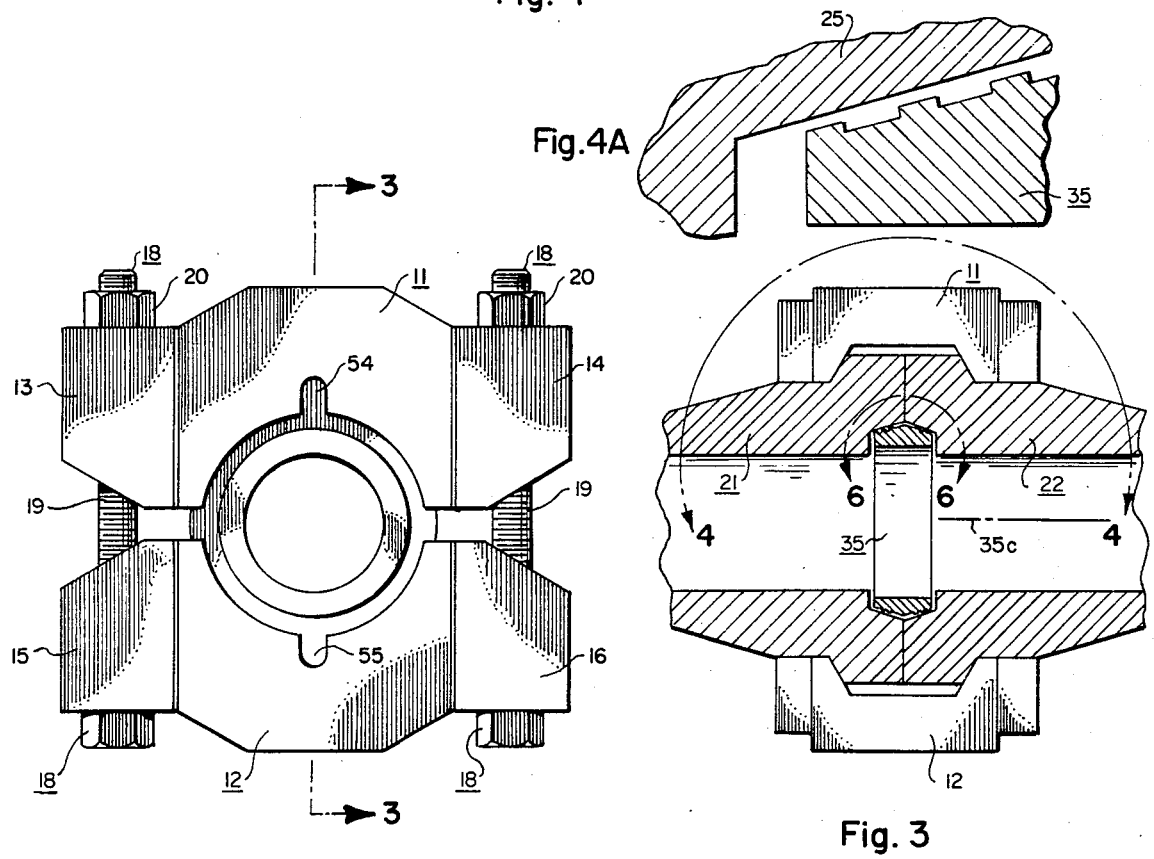
Fig. 2
Fig. 3

CONDUIT CONNECTOR STRUCTURE AND SEALING-RING THEREFOR

FIELD OF INVENTION

The present invention relates to conduit connector structure or coupling means whereby two fluid conduits may be securely coupled together in a manner to avoid leakage. In this invention the sealing ring employed to effect seal integrity has oppositely tapered outer peripheral sides which have plural, mutually spaced sealing lands, this for the purpose of preserving the seal function even though a portion of the seat, as is engaged by one of the lands, might be damaged to otherwise deter seal effectiveness.

DESCRIPTION OF PRIOR ART

In the past, many types of couplings have been employed to secure together fluid conduit. These conventionally employ gaskets, rubber or other elastomeric sealing rings, rubber O-rings, and so forth. While seal rings are certainly not unknown in this art, see following U.S. patents: Latham U.S. Pat. No. 3,325,176 and Latham U.S. Pat. No. 4,214,763; this is believed the first time, as the present invention, where multiple sealing lands are chosen to exist at the oppositely tapered peripheral surfaces of the ring. The prior art above-mentioned is relevant as regards the concept of using seal rings having conical cross-sections. Neither of the patents, however, teach the advantage of employing multiple sealing lands so as to preserve overall sealing integrity despite the fact that the seats cooperable with such sealing lands may be scored or deformed, at least as to one or two of the lands. Indeed, in past installations, serious difficulty has been encountered in connection with use of desirably hardened metal sealing rings made of stainless steel, for example, and cooperation with seats of softer metal or portions thereof might be deformed or scored. In the prior art this has been a difficulty chancing leakage just be virtue of the deformations of the seats of the stretcher. Perhaps even scratches will produce slight inwardly directed protuberances which are difficult to deal with so far as the sealing is concerned.

BRIEF DESCRIPTION OF THE INVENTION

According to the present invention, inter-conduit coupling is effected through the employment of a pair of flange members which are urged together by camming clamps the latter being secured together and tightened down by bolts, threaded studs, and the like. Each of the flange members include an inner essentially conical or tapered surface serving as respective seats for the sealing ring employed. The sealing ring itself includes an upstanding medial peripheral apex defined by downwardly sloping sides. These sides incorporate mutually spaced peripheral sealing lands which are intended to serve as sealing surfaces relative to the seats provided the flange members. Typically for a three-inch (I.D.) ring, the raised sealing lands will be raised approximately ten-thousandths of an inch above adjacent recesses and approximately the same amount relative to the sides forming the medial or central apex. Typical dimensions, width-wise relative to the sealing lands, will be about fifty thousandths of an inch, with eighty thousandths clearance existing as between the lands on respective sides of such sealing ring. The attachment bolts accommodating the camming clamps are torqued sufficiently to have desired seal pressures exist as between the individual seal lands and those cooperating portions of the seats of the respective flange members. Pressures of 25 to 30 thousand psi at the seal surfaces are generally satisfactory. It is to be noted that at these pressures, the material for the sealing ring will be chosen and the recesses dimensioned so that these will not "close out" during the torquing of the clamping bolts. By the employment of multiple sealing lands, the same can act independently to provide seals thereat even though lands or, more probably, seal surfaces for other lands are scarred and might otherwise fail, when taken separately, as to the sealing function. It is to be noted that seals are maintained not in end-to-end compression but rather in radial compression, the apex being either non-functional or serving simply as a positioning means, depending upon its height. Alternatively, the seal can include an outwardly projecting, circumferential apex rib, this to further aid in the securement of the flange members to which conduit to be coupled will be welded. The rib, however, is simply to insure the flush approach in parallel condition of adjacent faces of the respective flange members, and will not be designed so as to preclude the basic sealing function of the sealing lands aforementioned.

OBJECTS

Accordingly, a principal object of the present invention is to provide new and improved conduit connector structure.

A further object is to provide a new and improved fluid coupling.

A further object is to provide a fluid coupling suitable for handling corrosive or other fluids under all pressure or vaccuum conditions.

A further object is to provide in a fluid coupling a metal sealing ring means having an outer surface recessed to control stress distribution and elastic deformation when the ring is brought into radial compression.

A further object is to provide, in conduit coupling structures, a sealing ring having oppositely tapered sides each provided with multiple sealing lands.

A further object is to provide a new and useful type of fluid seal ring wherein, the sealing function not be effective as to certain portions of the ring and its seat, other portions of the ring will be effective to retain the seal desired.

A further object is to provide in fluid coupling structure a sealing ring and associated flange member structure, the sealing ring engaging inner tapered surfaces of such flange members, and with such sealing ring having multiple or sealing lands for ensuring seal integrity even though certain portions of the seats of the flange members might be scored or otherwise deformed.

BRIEF DESCRIPTION OF DRAWINGS

The features of the present invention, together with further objects and advantages thereof, may best be understood by reference to the drawings in which:

FIG. 2 is an end view of the structure of FIG. 1 and taken along the section line 2—2 in FIG. 1.

FIG. 3 is a cross-section of the structure of FIGS. 1 and 2 and is taken along the line 3—3 in FIG. 2.

FIG. 4 is an enlarged fragmentary sectional detail of the structure shown within the arcuate line 4—4 in FIG. 3, shown immediately prior to seal-section 2.

FIG. 4A is enlarged fragmentary section detail taken along the line 4A in FIG. 4, illustrating the approach of the left-hand flange member toward the sealing ring as the clamp halves are tightened together.

DESCRIPTION OF PREFERRED EMBODIMENTS

Figure 6:
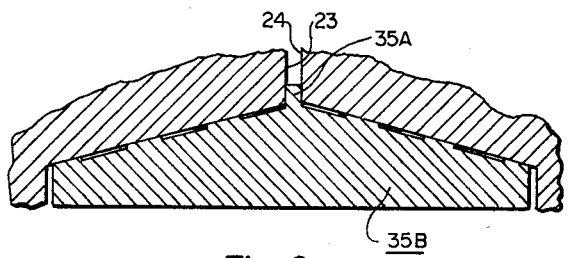
FIG. 6 is a fragmentary detail of an upper portion of the structure in FIG. 3, as is enclosed in the arcuate line 6—6, but which now illustrates the sealing ring as incorporating a peripheral, central, apex rib.

In the drawings the conduit connector structure 10 is shown to include an upper clamp segment 11 and a lower clamp segment 12. Each of these segments have respective bosses 13–16 which are integral relative to the respective clamp segments and which are provided with apertures 17 receiving bolts 18, the same being four in number. The bolts may comprise threaded shanks 19 having opposite end nuts 20 or may simply be headed bolts having respective end nuts.

Of further importance in the construction of the conduit connector structure 10 is the provision of a pair of flange members 21 and 22, the same having mutually facing annular, mutually facing end surfaces or faces 23 and 24, flange portions 25 and 26, and flange bodies 27 and 28, the latter being integral with the respective flange portions 25 and 26.

Annular, inclined or tapered surfaces 29 and 30 of flange portions 25, 26 are essentially disposed at the same angle as the inner inclined surfaces 31 and 32 of each of the clamp segments 11 and 12. Importantly, annular recesses 33 and 34 are essentially defined by annular base and side surfaces 33A, 34A, 33B and 34B; recesses 33, 34 are contiguous with surfaces 23 and 24, respectively, and cooperatively receive metal sealing ring 35, the latter having central axis 35C.

Figure 5:
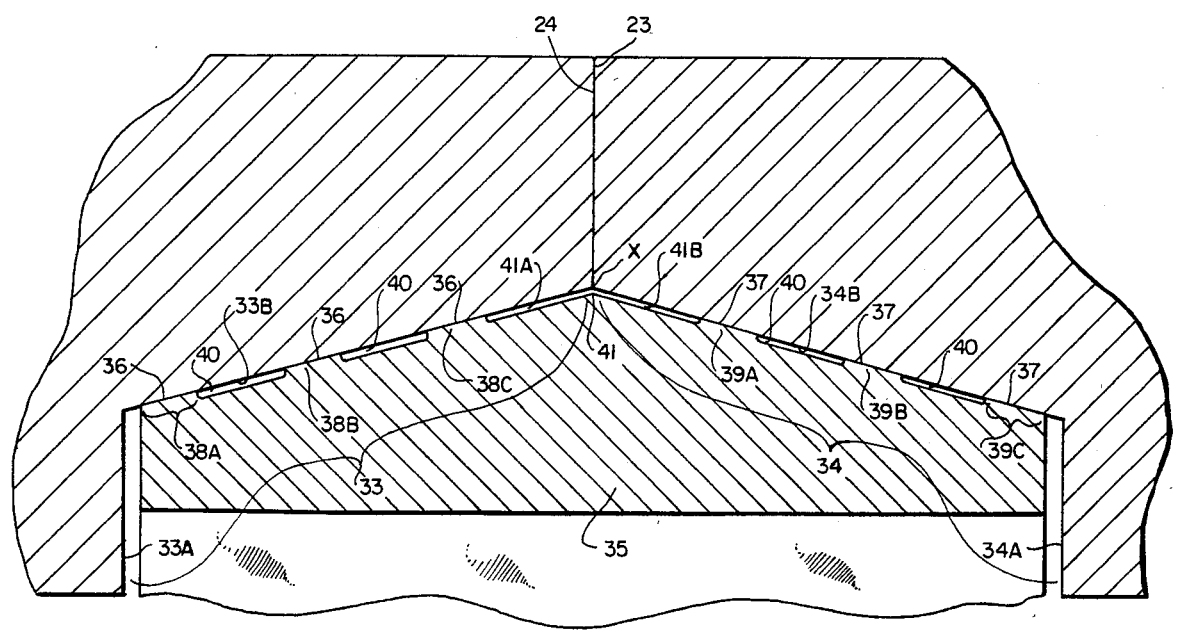
FIG. 5 is an enlarged transverse section of an upper portion of the structure in FIG. 3, and is shown in fragmentary section detail, illustrating the seating position of the sealing ring lands against the tapered seats of the respective flange members of the coupling structure.

A typical longitudinal section of the upper portion of the sealing ring is shown in FIG. 5 wherein it is seen that the combined, extrapolated surfaces 36 and 37 are parallel to and congruent with annular, tapered, sealing seat surfaces 33B and 34B having extrapolation intersection X, of the respective flange members 21 and 22. Raised annular sealing lands 38A, 38B and 38C and 39A, 39B and 39C have the outer surfaces 36, 37 congruent with respective seat surfaces 33B, 34B of flange members 21, 22 respectively, and also are respectively mutually spaced apart by interland recesses 40. A medial, annular apex 41, see FIG. 5, of the sealing ring is formed by recessed sloping sides 41A, 41B; this annular apex need perform no pressure-seal or other function, but can, if of sufficient height, be used to position the seal ring without severe, non-recoverable misalignment.

In operation, broadly, the upper and lower clamp segments 11 and 12 are brought together vertically by the tightening of nuts 20 relative to bolts 18. Owing to the tapered character of the surfaces 29–32, see FIG. 4, the flange members will be progressively brought together such that surfaces 23 and 24 in FIG. 4 gradually approach each other. These latter surfaces are not intended to contact one another until after the requisite seal pressures have been produced as between the surfaces 36 and 37 of the peripheral sealing ring lands 38A–38C and 39A–39C and their seals against seal surfaces 33B and 34B. Accordingly, the sealing ring is maintained in radial compression, and the sealing pressure should be at least 25 to 30,000 psi at the seal surfaces. The torquing of the clamp segment bolts, however, is continued until the compression loading between faces 23 and 24 of flange members 21 and 22 is approximately two-thirds of the overall loading supplied by the clamps. Thus, even though interface per unit loading is only perhaps one-eighth the per unit loading at the seal surfaces, the total axial loading supplied at faces 23 and 24 will be sufficient to deter the effects of thermal cycling and anticipated extreme bending moments at the coupling junction. For high integrity sealing, the employment of a high-strength stainless or low alloy steel is contemplated for the seal ring, such as a 286 stainless or 4140 low alloy steel, both having a high Young's modulus. A softer low-strength carbon steel could be employed for the seal ring, but the same would have a greater tendency to distort and may not be suitable for corrosive liquids and gases, extemely high pressures, and so forth.

It should be noted at this juncture that should either the seats 33B or 34B, or even a sealing land of the sealing ring itself, become misshapen, scored or deformed, this will not deter the sealing effect as to the remaining sealing lands and such seats. The flange members will be formed such that the axial recess depths, from a longitudinal standpoint, will exceed in their combined dimension the overall width of the ring. Surfaces 33A and 34A should not be designed to pressure-contact the opposite sides of the sealing ring, which if that were to happen, would deleteriously influence the seals intended for the peripheral sealing lands.

Medial or central annular apex 41 can simply be used for positioning purposes; no sealing effect is intended at this juncture, and there should be no loading at the apex area when the clamps are brought together.

Accordingly, FIG. 4A illustrates the condition when the clamps are tightened and a respective flange member is urged to the right to more closely approach the sealing ring such that its internal seat approaches and finally pressure-contacts the sealing lands of the ring.

In certain applications it may well be that a peripheral apex, radially outwardly extending rib should be provided. This would be especially true where surfaces 23 and 24, see FIG. 6, are to be brought together in very exact parallel relationship. In such event a radially outwardly extending peripheral rib 35A can be supplied the sealing ring 35B corresponding to sealing ring 35 in FIG. 4. Again, the engagement of surfaces 23 and 24 with the rib 35A should not exist at least until after the sealing pressures desired relative to the sealing ring lands and the respective seats, have been reached.

Figure 1:
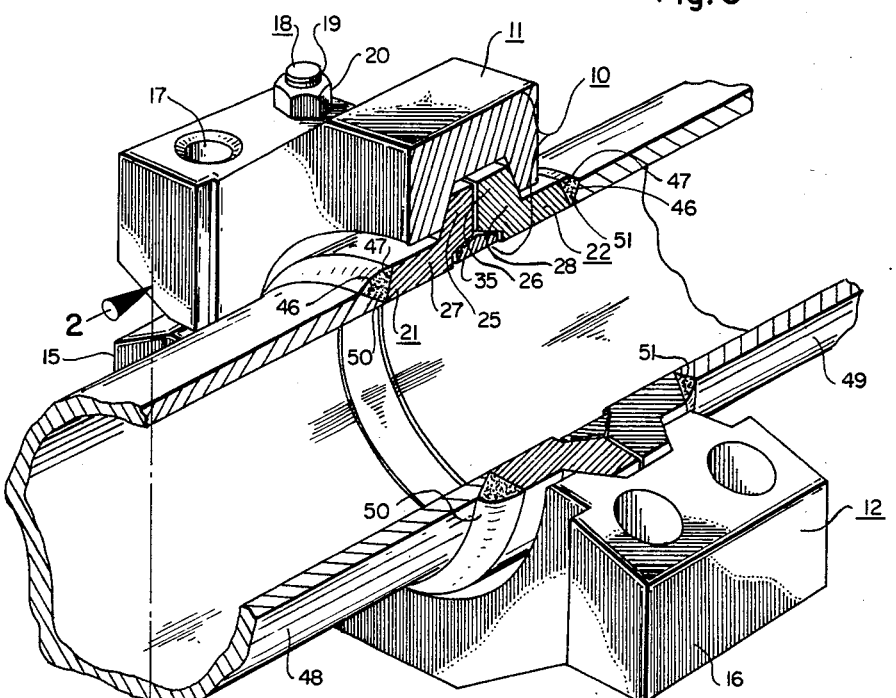
FIG. 1 is a perspective view, partially broken away and sectioned, of the conduit connector structure of the present invention in a preferred embodiment thereof, showing the flange member faces approaching each other.

It is noted that, importantly, all of the parts will be made of metal. No rubber gaskets, rubber seal rings, O-rings, and so forth, are generally intended in this particular high-pressure design. End chamfers as at 46 and 47 accommodate butt weld connection to align conduit 48 and 49, see FIG. 1. The welds are shown at 50 and 51.

There are many types weld configurations recessed, closings and attachment means that can be employed in lieu of the butt weld approach here given. What is important is that the coupling between the two conduit 48 and 49 take the form as that shown in FIG. 1.

In fabrication, then, the individual flange members 21 and 22 are preliminarily secured to the intended conduit. The flange members are then brought into alignment in a manner shown in drawings and the clamp segments are installed over the flange portions in the manner seen in FIG. 1.

As to certain additional structural details, portions 52 and 53 of each of the flange members are thickened with respect to the conduits 48 and 49, as indicated, to provide additional strength proximate the flange and sealing areas. Relief areas 54 and 55 may comprise simply recesses or slots in the individual upper and lower clamp segments, thereby providing certain stress relief when the clamp segments are tightened down by the bolt structures 18.

Accordingly, very high pressure seals are provided by the camming action of the clamp elements against surfaces 29 and 30 which urge the flange members 21, 22 toward each other, this resulting in the annular compression of the ring, whereby to stress the sealing ring 35, 35B within its elastic limit.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a pair of flange members having mutually-facing faces each provided with a mutually corresponding annular recess, such recesses having inner respective depths and forming inner, annular, inclined, conically straight-sided seal-seat surfaces, a metal, fluid sealing ring having a central interior axis and disposed in said recesses, said sealing ring having oppositely tapered, conically straight-sided opposite annular sides peripherally matching said recesses, each side being provided with vacant relief-groove means defining plural, ring-integral, mutually-spaced annular peripheral sealing lands engaging respective ones of said seal-seat surfaces, and means for advancing said flange members toward each other to compression-load at said sealing lands said sealing ring in radial directions throughout its length perpendicular to its central axis whereby to pressure-seat and thus seal said sealing lands of said ring against said seal-seat surfaces and thereby provide fluid seals thereat.

2. The structure of claim 1 wherein said ring has a nominal thickness dimension along said axis which is smaller than said depths, when combined, of said recesses.

3. The structure of claim 1 wherein said ring with said relief-groove means is so sized, relative to the dimensions of said flange members, such that said ring is solely radially compression-loaded for loading within the elastic limit of the ring material.

4. The structure of claim 1 wherein each of said recesses has a straight tapered outer wall, all of said annular sealing lands of said sealing ring have corresponding, outer, annular, straight-tapered surfaces respectively cooperating with said straight-tapered outer wall of each of said recesses.

5. The structure of claim 1 wherein each of said flange members comprises a cylindrical flange body provided with a thickened medial portion and a forward flange portion having an inner annular edge in part defining a respective one of said recesses.

6. The structure of claim 1 wherein said flange members have annular, outer, sloping, camming surfaces, said means comprising plural clamping segments having camming means operably engaging said camming surfaces and attachment means coupled to said clamping segments for drawing said segments mutually toward each other and thereby urging said flange members together.

7. In combination, a pair of axially aligned, hollow flange members each having a face provided with an inner edge recess, means for drawing said flange members together coupled thereto, each of said recesses being defined by a respective, annular, straight-tapered conical, axially outwardly and radially inwardly sloping sealing wall, a metal sealing ring having a central axis and seated in said recesses and abutting respective ones of said sealing walls, said ring having an outer peripheral surface provided with opposite, radially inwardly straight-tapered annular sides matching said recesses and each provided with groove means defining plural, annular, mutually spaced sealing lands conical extrapolations of which form a circular intersection with said axis of said ring forming its center, respective sets of said lands sealingly engaging respective ones of said sealing walls.

8. The structure of claim 7 wherein said sealing ring has a medial annular, raised apex disposed beneath said intersection of said surface extrapolations of said sealing lands in their relaxed position as to opposite sides of said sealing ring.

9. The structure of claim 8 wherein said apex is defined by opposite side surfaces indented inwardly relative to said sealing lands.

10. In fluid conduit coupling structure having first and second fluid conducting members individually provided with annular, oppositely sloping, straight-tapered seal surfaces and means for forcing said members toward each other: an improvement comprising a metal sealing ring interposed between said members for solely radially inward compression loading thereby, said ring having opposite, oppositely straight-tapered sides each having outer, raised, mutually spaced, similarly sloping, annular sealing land surfaces separated by grooves, said land surfaces all matching and pressure-engaging and seating at corresponding ones of said seal surfaces.

11. The structure of claim 10 wherein said ring has a radially outwardly projecting rib disposed between said fluid conducting members, said rib having a thickness dimension required to insure desired radial compression loading of said ring, adjusted within its elastic limit range.

12. The structure of claim 10 wherein said ring has a central annular ring-positioning apex of dimension less than that required to interfere with the radial compression loading of said ring, adjusted within its elastic limit range.

* * * * *